G. B. FILMER.
DEMOUNTABLE WHEEL RIM.
APPLICATION FILED APR. 17, 1914. RENEWED OCT. 9, 1918.
1,297,338.
Patented Mar. 18, 1919.
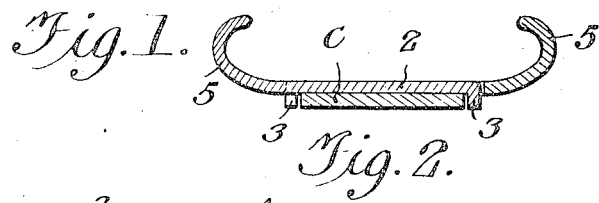
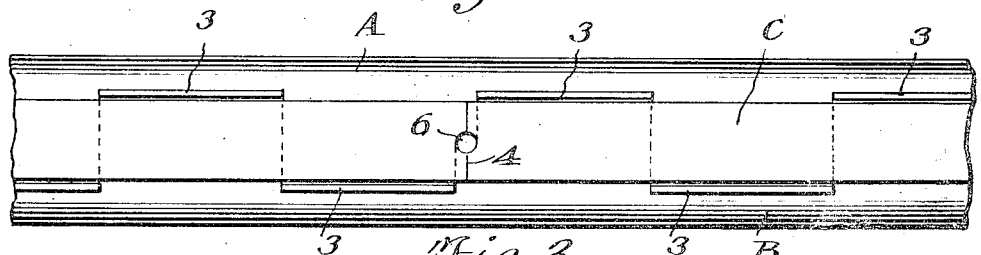
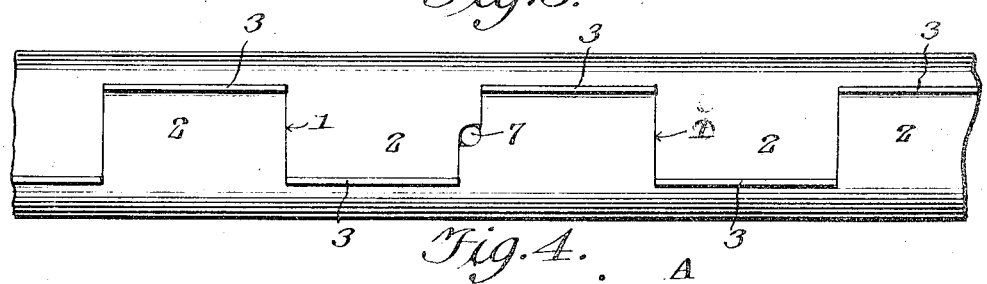
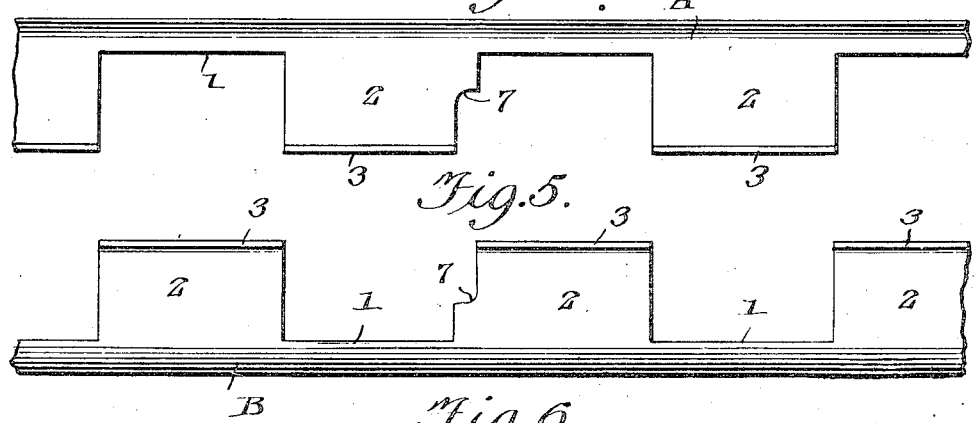
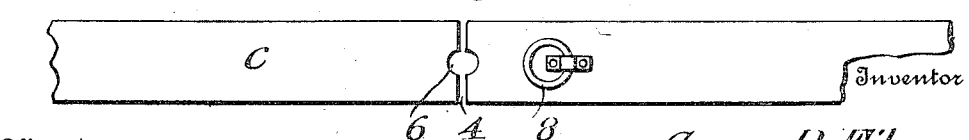
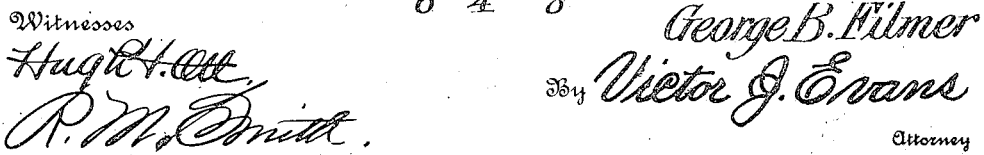
Witnesses
Inventor
George B. Filmer
By Victor J. Evans
Attorney

UNITED STATES PATENT OFFICE.

GEORGE B. FILMER, OF MOOSE JAW, PROVINCE OF SASKATCHEWAN, CANADA.

DEMOUNTABLE WHEEL-RIM.

1,297,338.

Specification of Letters Patent.    Patented Mar. 18, 1919.

Application filed April 17, 1914, Serial No. 832,595.   Renewed October 9, 1918.   Serial No. 257,534.

*To all whom it may concern:*

Be it known that I, GEORGE B. FILMER, a citizen of Canada, residing at Moose Jaw, in the Province of Saskatchewan and Dominion of Canada, have invented new and useful Improvements in Demountable Wheel-Rims, of which the following is a specification.

This invention relates to demountable wheel rims, the object of the invention being to produce a simple, cheap and reliable sectional and demountable rim the parts of which are so combined and related to each other that they may be easily separated as soon as the rim is removed from the felly of a wheel so as to release the tire, the parts of the rim being reassembled with equal ease and without the aid of special tools.

With the above and other objects in view, the invention consists in the novel construction, combination and arrangement of parts, as will hereinafter be more fully described, illustrated and claimed.

In the accompanying drawings:—

Figure 1 is a cross section through a demountable rim embodying the present invention. Fig. 2 is an inside diagrammatic face view of the rim showing all parts thereof assembled in their proper relation.

Fig. 3 is a similar view omitting the locking band.

Figs. 4 and 5 are similar views of the two sections of the rim showing the same separated from each other.

Fig. 6 is a similar view of the locking band.

The sectional demountable rim contemplated in this invention comprises the two main sections A and B and the locking band C, said parts being combined and related to each other in the manner illustrated in Fig. 1.

The sections A and B are preferably identical and therefore interchangeable, each of said sections being formed with any desired number of notches 1 preferably rectangular in shape thereby forming intervening tabs or tenons 2, the notches or mortises 1 and the tabs or tenons 2 alternating as clearly shown in Figs. 4 and 5 so that the tabs or tenons 2 of one section of the rim will fit into the notches or mortises 1 of the other section of the rim thereby preventing any relative longitudinal movement of the sections A and B.

The tabs or tenons 2 are provided along their outer edges with locking lips 3 adapted to be engaged by the locking band C and it will be understood that when the two sections A and B are brought together in their proper relation, considerable space will be left between the planes of the locking lips of said sections, said space being approximately equal to or slightly greater than the width of the locking band C.

The locking band C is of spring metal and is shown as split or divided at 4. In either case the locking band C may be sprung between the locking lips 3 of the rim sections A and B, it being understood that the sections A and B are endless. The said rim sections A and B are also provided upon their outer sides and along their outer marginal edges with tire holding flanges 5 which may be of any desired shape to accommodate the straight sided outer case or the clencher case or any other form of tire.

The locking band C is provided with a hole 6 for the valve tube and the sections A and B of the rim are likewise formed with a hole 7 for the same purpose, the holes 6 and 7 being brought into proper line with each other to receive the valve tube of the inner tube of the tire. Any suitable means may be employed for detachably fastening the demountable rim hereinabove described to the felly of a wheel.

While the accompanying drawings illustrate the locking band as being arranged in the exact center of the rim as a whole, it will of course be obvious that said locking band may be arranged toward one side or the other of the rim, the locking lips 3 being located accordingly. It is, however, preferred to adhere to the central arrangement of the locking band for the reason that the rim sections A and B are then identical and interchangeable.

The rim hereinabove described may be made in equal sections or halves, each one-half the width of the complete rim or said sections may be made one relatively wider than the other so as to bring the divisional strip under the bead of the tire. Furthermore, in order to facilitate the removal of the locking band, the latter may be provided with a ring 8 or its equivalent located preferably adjacent to one end of said locking band.

What I claim is:—

A sectional demountable wheel rim, comprising two endless bands of sheet metal and of uniform thickness throughout provided with interfitting tenons and mortises along their inner margins all arranged in longitudinal alinement, the inner edges of the tenons being bent inwardly to provide two series of locking lips in spaced and staggered relation to each other, and a detachable spring metal locking band lying between the said series of locking lips flatwise against the inner faces of said tenons and edgewise between said bent locking lips, portions of both edges of said band being exposed at all of the intervals between said lips, and the extremities of the locking band being notched to fit the valve tube of a tire.

In testimony whereof I have affixed my signature in presence of two witnesses.

GEORGE B. FILMER.

Witnesses:
LILLIAN JOHNSON,
V. B. LACKEY.